(12) United States Patent
Meguro et al.

(10) Patent No.: US 8,822,070 B2
(45) Date of Patent: Sep. 2, 2014

(54) BATTERY WITH SECURE SHORT-CIRCUITING MECHANISM

(75) Inventors: Takeshi Meguro, Fukushima (JP);
Shinji Hatake, Fukushima (JP);
Masanori Anzai, Fukushima (JP);
Noriaki Kokubu, Fukushima (JP);
Tsutomu Suehiro, Kanagawa (JP)

(73) Assignee: Sony Corporation (JP)

( * ) Notice: Subject to any disclaimer, the term of this patent is extended or adjusted under 35 U.S.C. 154(b) by 801 days.

(21) Appl. No.: 12/015,883

(22) Filed: Jan. 17, 2008

(65) Prior Publication Data

US 2008/0213658 A1 Sep. 4, 2008

(30) Foreign Application Priority Data

Jan. 23, 2007 (JP) .................. 2007-012388

(51) Int. Cl.
*H01M 2/30* (2006.01)
*H01M 2/34* (2006.01)

(52) U.S. Cl.
USPC ........................................................ 429/178

(58) Field of Classification Search
None
See application file for complete search history.

(56) References Cited

U.S. PATENT DOCUMENTS

| 2001/0031391 A1* | 10/2001 | Hironaka et al. | 429/94 |
| 2006/0051667 A1* | 3/2006 | Kim | 429/184 |
| 2006/0078793 A1* | 4/2006 | Seino | 429/218.1 |

FOREIGN PATENT DOCUMENTS

| JP | 09-259926 | 10/1997 |
| JP | 3178586 | 4/2001 |
| JP | 2001-338636 | 12/2001 |
| JP | 2002-515637 | 5/2002 |
| JP | 2003-123843 | 4/2003 |
| JP | 2003-168404 | 6/2003 |
| JP | 2004-220816 | 8/2004 |
| JP | 2005-100769 | 4/2005 |
| JP | 2005-158649 | 6/2005 |
| JP | 2006-049312 | 2/2006 |
| JP | 2006-134682 | 5/2006 |
| JP | 2006-261072 | 9/2006 |
| JP | 2006-294519 | 10/2006 |

OTHER PUBLICATIONS

Office Action issued on Mar. 24, 2009, in related Japanese application JP 2007-012388.

* cited by examiner

*Primary Examiner* — Patricia L Hailey
*Assistant Examiner* — Colin W Slifka
(74) *Attorney, Agent, or Firm* — Sheridan Ross P.C.

(57) ABSTRACT

A battery includes: a battery element having a cathode and an anode; a package can containing the battery element and being electrically connected to one of the cathode and the anode; and external connection terminal being connected to the other one of the cathode and the anode; and having a plate-like base contained in the package can and a leading portion extending to outside of the package can; and an insulating member separating the external connection terminal from the battery element. The base of the external connection terminal is spaced from an internal wall face of the package can, and the insulating member has notches at a position where the base of the external connection terminal is layered on the insulating member in the thickness direction of the package can.

16 Claims, 5 Drawing Sheets

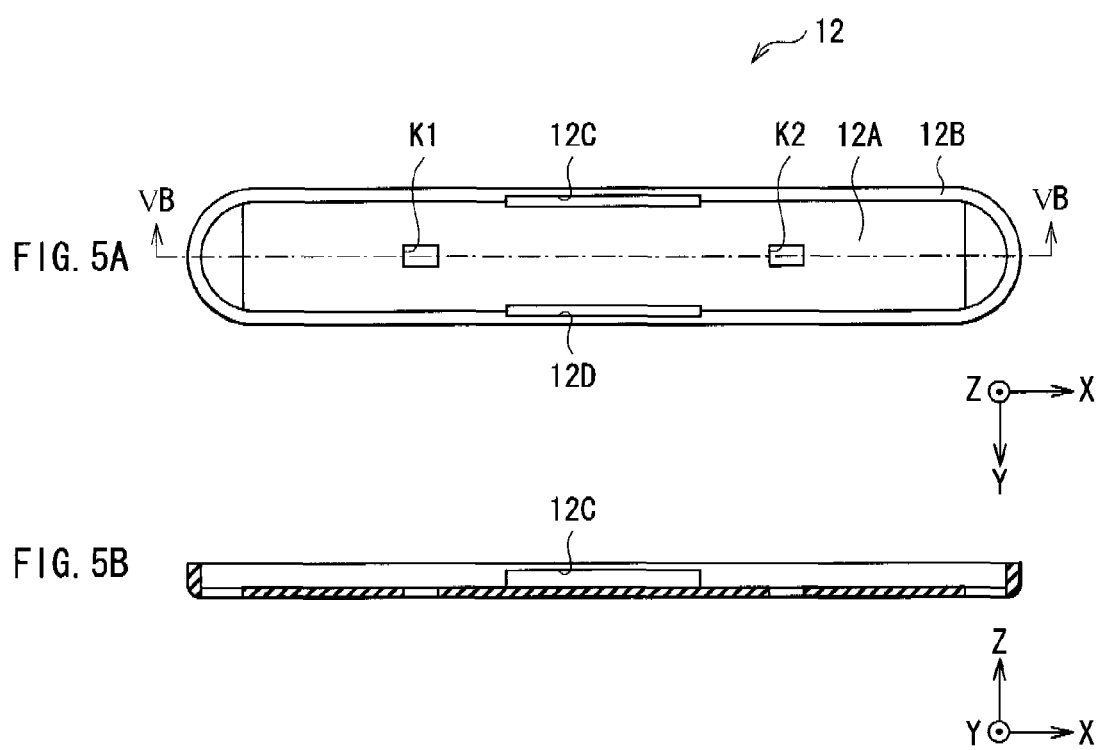

BATTERY WITH SECURE SHORT-CIRCUITING MECHANISM

CROSS REFERENCES TO RELATED APPLICATIONS

The present invention contains subject matter related to Japanese Patent Application JP 2007-012388 filed in the Japanese Patent Office on Jan. 23, 2007, the entire contents of which being incorporated herein by reference.

BACKGROUND OF THE INVENTION

1. Field of the Invention

The present invention relates to a battery that includes: a package can containing a battery element having a cathode and an anode; and an external connection terminal having the polarity different from that of the package can.

2. Description of the Related Art

In recent years, many portable electronic devices such as combination cameras (videotape recorder), mobile phones, and notebook personal computers have been introduced, and their size and weight have been reduced. For a battery used as a portable power source for these portable electronic devices, in particular a secondary battery as a key device, research and development has been actively promoted to improve the energy density. Specially, a nonaqueous electrolyte secondary battery (for example, lithium ion secondary battery) can provide a higher energy density compared to a lead battery and a nickel cadmium battery as an existing aqueous electrolytic solution secondary battery. Thus, studies of improving such a nonaqueous electrolyte secondary battery have been made in various fields.

As an anode active material used for the lithium ion secondary battery, a carbon material such as non-graphitizable carbon and graphite that shows the relatively high capacity and has the favorable cycle characteristics has been widely used. Meanwhile, as an anode with the higher capacity than that of the carbon material, researches on an alloy material have been promoted. In such an alloy material, the fact that a certain type of metal is electrochemically alloyed with lithium, and the resultant alloy is reversibly generated and decomposed is applied.

In the battery with the higher capacity as above, securing the safety is important more than before. For example, when some external force is excessively applied to the package can of the battery, that is, applied to the degree that the package can is deformed, resulting in short circuit between the cathode and the anode inside the battery element, an active material may generate a great deal of heat. Thus, in the past, the following mechanisms have been proposed. In one of the mechanisms, when a package can is deformed, short circuit is generated at a portion different from a battery element, and in another mechanism thereof, when a package can is deformed, current collectors are short-circuited (for example, refer to International Publication No. WO99/059213, Japanese Unexamined Patent Application Publication Nos. 2001-338636, 9-259926 and 2006-49312, and Japanese Patent Publication No. 3178586). These mechanisms intend to block the battery reaction and thereby safely terminating the power generation function.

SUMMARY OF THE INVENTION

However, in the short circuit mechanisms each described in the foregoing patent documents, the structures thereof are complicated. Thus, such mechanisms may lead to complication in manufacturing, and may prevent the entire structure from being small-sized.

In view of the foregoing, in the invention, it is desirable to provide a simply structured, safe and secure battery that can securely short-circuit electrodes to prevent heat generation when being crushed by external force.

According to an embodiment of the invention, there is provided a first battery including a battery element having a cathode and an anode, a package can containing the battery element and being electrically connected to one of the cathode and the anode, an external connection terminal being connected to the other one of the cathode and the anode and having a plate-like base contained in the package can and a leading portion extending to outside of the package can, and an insulating member separating the external connection terminal from the battery element. The base of the external connection terminal is spaced from an internal wall face of the package can. The insulating member has notches at a position where the base of the external connection terminal is layered on the insulating member in the thickness direction of the package can.

According to an embodiment of the invention, there is provided a second battery including a battery element having a cathode and an anode, a package can containing the battery element and being electrically connected to one of the cathode and the anode, and an external connection terminal being connected to the other one of the cathode and the anode, and having a plate-like base contained in the package can and a leading portion extending to outside of the package can. The base of the external connection terminal is spaced from an internal wall face of the package can with a distance of 1 mm or less.

In the first and the second batteries of the embodiments of the invention, when the package can is deformed due to the external force, the plate-like base contained in the package can is contacted with the internal wall face of the package can. The polarity of the package can is different from the polarity of the terminal. Therefore, when the plate-like base contained in the package can is contacted with the internal wall face of the package can, short circuit is surely generated.

According to the first battery of the embodiment of the invention, the external connection terminal has the polarity different from that of the package can. The base thereof is spaced from the internal wall face of the package can. The insulating member that separates the external connection terminal from the battery element has the notches at the position where the base of the external connection terminal is layered on the insulating member in the thickness direction of the package can. Therefore, when the package can is deformed due to excessive external force, part of the terminal and the internal wall face of the package can are able to be surely short-circuited before internal short circuit of the battery element is generated. Consequently, heat generation of the battery element can be prevented, and thus the safety is improved. Further, there is no need to add a new member to compose such a short circuit mechanism, so the structure and the manufacturing can be simplified. Consequently, the embodiment of the invention is suitable for attaining a small sized battery and mass production thereof.

According to the second battery of the embodiment of the invention, the external connection terminal has the polarity different from that of the package can, and the base thereof is spaced from the internal wall face of the package can with a distance of 1 mm or less. Therefore, when the package can is deformed due to excessive external force, effects similar to those of the foregoing first battery can be obtained.

In particular, when the anode has an anode active material that contains at least one of a metal element and a metalloid element as an element, and that can insert and extract an electrode reactant, the battery energy density is large and the calorific value when short circuit is generated inside the battery element is large, and thus still higher safety is demanded in this case. In the battery of the embodiment of the invention, even when such an anode is included in the battery, heat generation is effectively prevented, and high safety can be realized.

Other and further objects, features and advantages of the invention will appear more fully from the following description.

BRIEF DESCRIPTION OF THE DRAWINGS

FIG. 5A and FIG. 5B are a plan view and a cross section showing a detailed structure of an insulating plate shown in FIG. 1;

DETAILED DESCRIPTION OF THE PREFERRED EMBODIMENT

Figure 1:
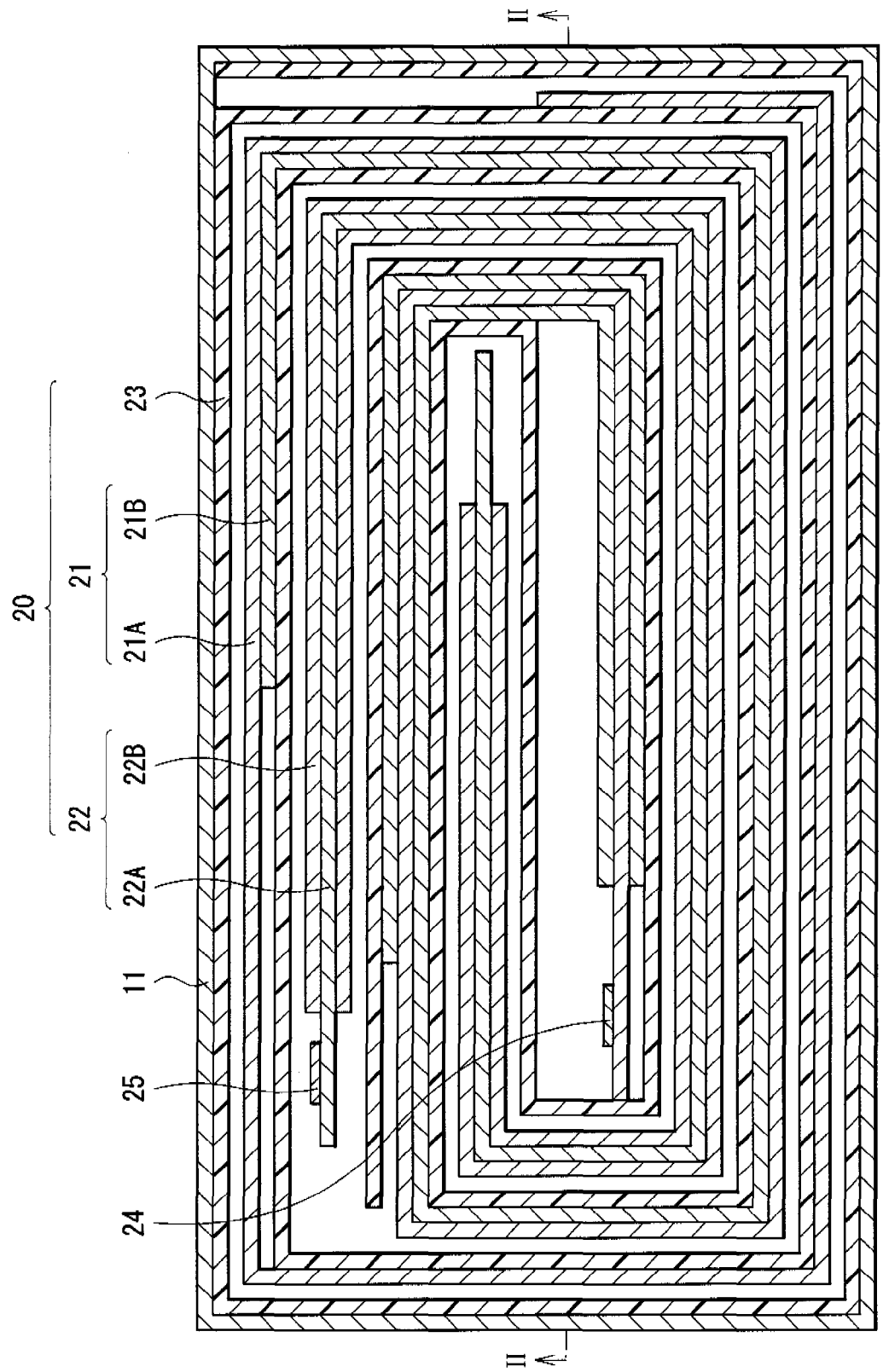
FIG. 1 is a cross section showing a structure of a secondary battery according to an embodiment of the invention.

An embodiment of the invention will be hereinafter described in detail with reference to the drawings. In the drawings, respective elements are schematically shown with the shape, the size, and the arrangement relationship to the degree that they bring understanding of the invention. Thus, the dimensions thereof are different from the actual dimensions.

Figure 2:
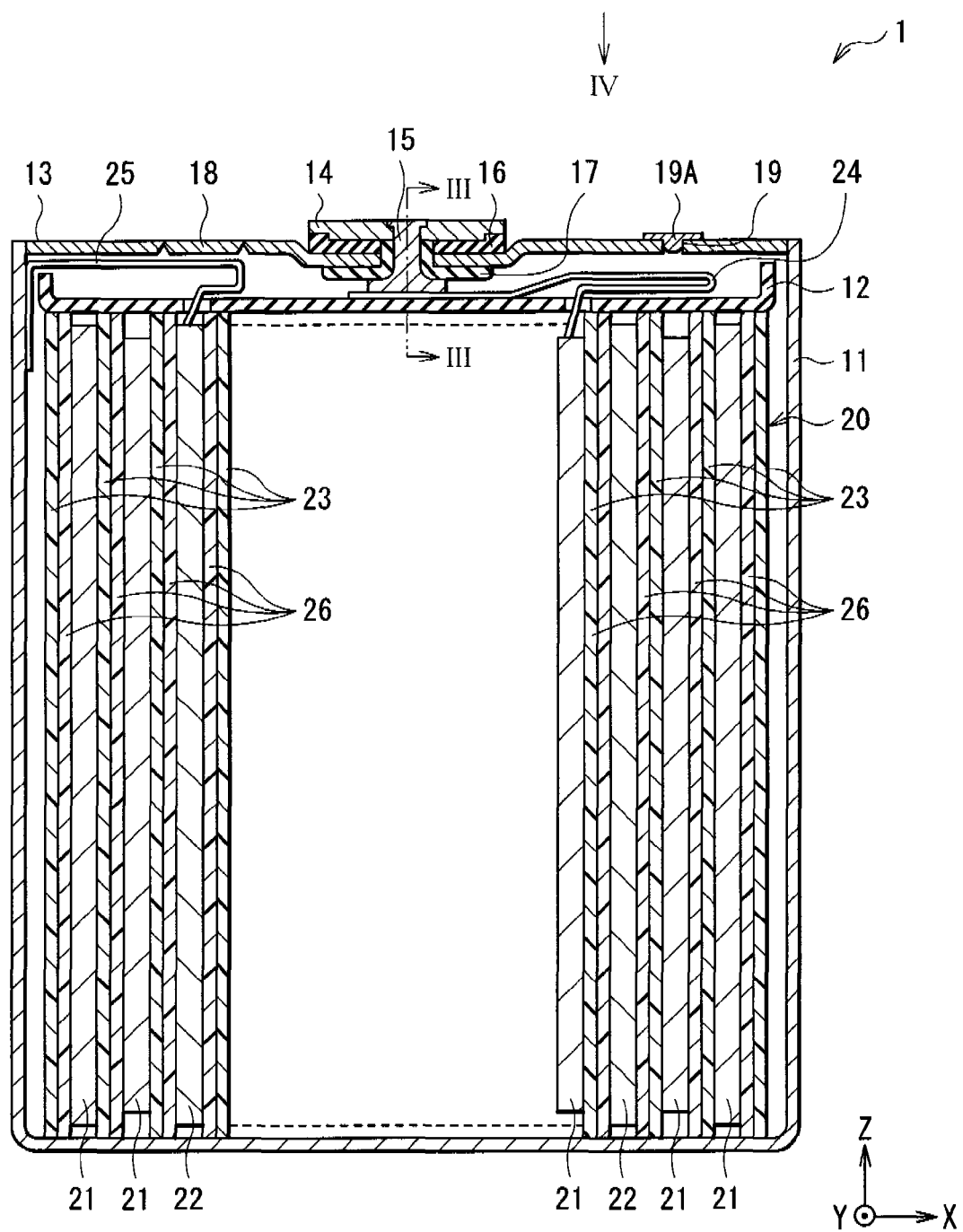
FIG. 2 is a cross section showing a structure taken along cutting-plane line II-II of a battery element shown in FIG. 1.

FIG. 1 and FIG. 2 show a cross sectional structure of a secondary battery according to an embodiment of the invention. The cross section shown in FIG. 1 and the cross section shown in FIG. 2 are perpendicular to each other. That is, FIG. 2 is the cross section in the arrow direction taken along cutting-plane line II-II shown in FIG. 1. The secondary battery is a so-called square battery in which a flat-shape battery element 20 is contained in a package can 11 in the shape of an approximately hollow cuboid.

The package can 11 is made of, for example, iron (Fe) plated by nickel (Ni). The package can 11 also has a function as an anode terminal. In the package can 11, one end of the package can 11 is closed and the other end thereof is opened. At the open end of the package can 11, an insulating plate 12 and a battery cover 13 are attached, and thereby inside of the package can 11 is hermetically closed. The insulating plate 12 is made of polypropylene or the like, and is arranged perpendicular to the spirally winding circumferential face of the battery element 20. The battery cover 13 is, for example, made of a material similar to that of the package can 11, and also has a function as an anode terminal together with the package can 11. Outside of the battery cover 13, a terminal plate 14 as part of a cathode terminal is arranged. In the approximate center of the battery cover 13, a through-hole is provided. A cathode pin (external connection terminal) 15 that is electrically connected to the terminal plate 14 is inserted in the through-hole. The terminal plate 14 is electrically insulated from the battery cover 13 by an insulating case 16. The cathode pin 15 is electrically insulated from the battery cover 13 by a gasket 17. That is, the cathode pin 15 is electrically insulated from the package can 11. The insulating case 16 is made of, for example, polybutylene terephthalate. The gasket 17 is made of, for example, an insulating material such as tetrafluoroethylene, and the surface thereof is coated with asphalt.

In the vicinity of the rim of the battery cover 13, a cleavage valve 18 and an electrolytic solution injection hole 19 are provided. The cleavage valve 18 is electrically connected to the battery cover 13. When the internal pressure of the battery becomes a certain level or more due to internal short circuit, external heating or the like, the cleavage valve 18 cleaves to prevent increase of the internal pressure. The electrolytic solution injection hole 19 is sealed by a sealing member 19A made of, for example, a stainless steel ball.

Figure 3:
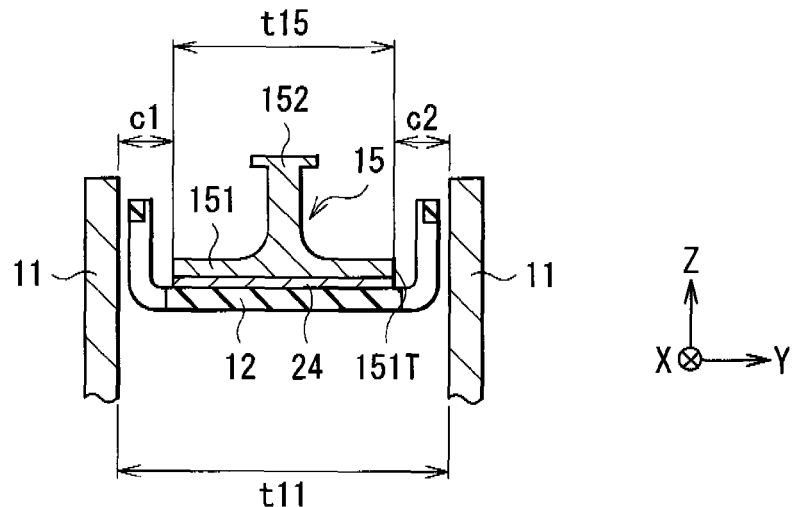
FIG. 3 is a cross section in the arrow direction taken along cutting-plane line III-III of a cathode pin shown in FIG. 2.
Figure 4A:
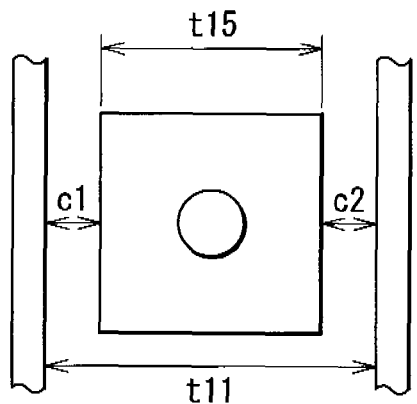
FIG. 4A and FIG. 4B are plan views of the cathode pin shown in FIG. 2 viewed from the arrow direction IV.
Figure 4B:
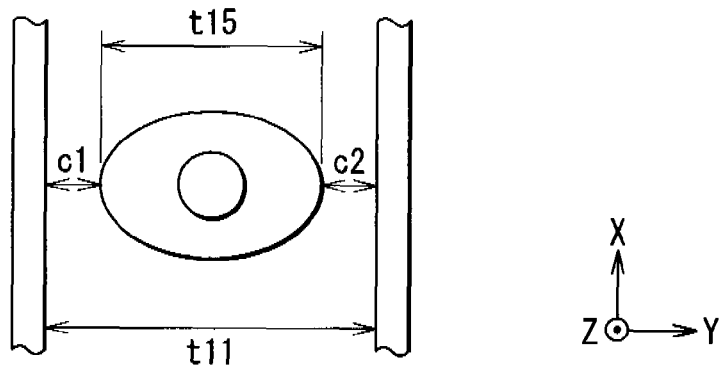

A description will be given in detail of the physical relationship between the cathode pin 15 and the package can 11. FIG. 3 is a cross section in the arrow direction taken along cutting-plane line III-III shown in FIG. 2. FIG. 4A and FIG. 4B are plan views viewed in arrow direction IV shown in FIG. 2, and show a plane parallel to the face holding the cathode pin 15. In FIG. 3, FIG. 4A, and FIG. 4B, only the package can 11, the insulating plate 12, the cathode pin 15, and the cathode lead 24 are shown, and other members such as the terminal plate 14, the insulating case 16, and the gasket 17 are not shown. The cathode pin 15 has a plate-like base 151 contained in the package can 11 and a leading portion 152 extending to outside of the package can 11. The base 151 is a plate-like portion extending toward the package can 11. An edge 151T thereof is proximate to the internal wall face of the package can 11 in the thickness direction (Y-axis direction) of the package can 11. The dimension in the Z-axis direction of the base 151 is, for example, from 0.01 mm to 10.0 mm. Both distances C1 and C2 between the internal wall face of the package can 11 and the edge 151T of the cathode pin 15 are desirably 1.20 mm or less. Distance t11 between two internal faces in the thickness direction of the external can 11 is, for example, 1.5 times or less the width dimension t15 of the cathode pin 15. The planar shape of the base 151 of the cathode pin 15 may be a square (or a rectangle) as shown in FIG. 4A, or a flat shape (or an oval shape) as shown in FIG. 4B. The cathode pin 15 is made of, for example, the simple substance of aluminum or an alloy of aluminum. On the surface thereof, a plating film made of aluminum (Al), copper (Cu), silicon (Si), magnesium (Mg) or the like is formed.

The insulating plate 12 has a structure as shown in FIG. 6A and FIG. 5B. FIG. 6A is a top view, and FIG. 5B is a broken side view taken along line VB-VB of FIG. 6A. Specifically, the insulating plate 12 has a plate-like bottom 12A with the rectangle plane and a wall 12B standing along the edge of the bottom 12A. The planar shape of the wall 12B is a curved line according to the shape of the battery element 20 at the position corresponding to the both ends in the longitudinal direction of the bottom 12A. Further, two notches 12C and 12D are formed at the position where the base 151 of the cathode pin 15 is layered on the insulating plate 12 in the short side direction of the bottom 12A corresponding to the thickness direction (Y-axis direction) of a battery 1. In the bottom 12A, apertures K1 and K2 for leading out the cathode lead 24 and the anode lead 25 are provided. The insulating plate 12 is provided between the cathode pin 15 and the battery element 20, and functions as an insulating member for electrically insulating the cathode pin 15 from the battery element 20. In addition, the insulating plate 12 also has a function to prevent the cathode lead 24 connecting the cathode pin 15 to a cathode 21 from being contacted with the internal face of the package can 11 and an anode 22.

In the battery element 20, the cathode 21 and the anode 22 are layered with a separator 23 in between, and are spirally wound. The battery element 20 is formed into the flat shape according to the shape of the package can 11. In FIG. 2, the lamination structure of the cathode 21 and the anode 22 is simplified. The number of spirally winding the battery element 20 is not limited to the number shown in FIG. 1 and FIG. 2, but can be set voluntarily. The cathode lead 24 made of aluminum (Al) or the like is connected to the cathode 21 of the battery element 20. The anode lead 25 made of nickel or the like is connected to the anode 22. The cathode lead 24 is electrically connected to the terminal plate 14 by being welded to the lower end of the cathode pin 15. The anode lead 25 is welded and electrically connected to the package can 11.

Figure 6:
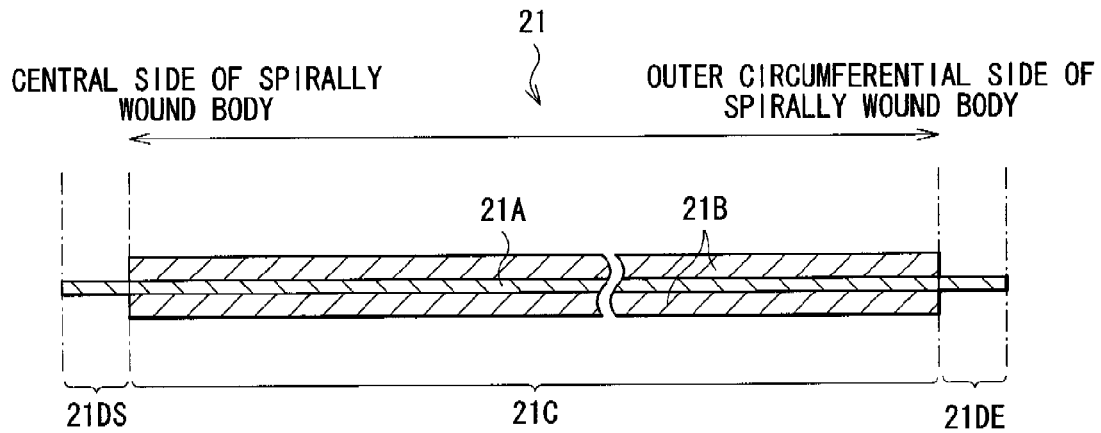
FIG. 6 is a cross section showing a structure of a cathode shown in FIG. 1 before being spirally wound.

FIG. 6 shows a cross sectional structure of the cathode 21 shown FIG. 1 before being spirally wound. In the cathode 21, a cathode active material layer 21B is provided on the both faces of a strip-shaped cathode current collector 21A. More specifically, the cathode 21 has a cathode coated region 21C in which the cathode active material layer 21B exists on the both faces of the cathode current collector 21A and a cathode exposed regions 21DS and 21DE which are located at the end on the central side and on the outer circumferential side of the spirally wound body so that the cathode exposed regions 21DS and 21DE sandwich the cathode coated region 21C, and in which the cathode active material layer 21B does not exist on the both faces of the cathode current collector 21A and thus the cathode current collector 21A is exposed. The cathode lead 24 is joined to the cathode exposed region 21DS on the central side of the spirally wound body.

The cathode current collector 21A is, for example, about from 5 μm to 50 μm thick, and is made of a metal foil such as an aluminum foil, a nickel foil, and a stainless foil.

The cathode active material layer 21B contains as a cathode active material, for example, one or more cathode materials capable of inserting and extracting lithium as an electrode reactant, and if necessary, may also contain an electrical conductor such as a carbon material and a binder such as polyvinylidene fluoride. As the cathode material capable of inserting and extracting lithium, for example, a metal sulfide, a metal selenide, a metal oxide or the like not containing lithium such as titanium sulfide ($TiS_2$), molybdenum sulfide ($MoS_2$), niobium selenide ($NbSe_2$), and vanadium oxide ($V_2O_5$); or a lithium-containing compound that contains lithium can be cited.

Some of the lithium-containing compounds can provide a high voltage and a high energy density. Examples of such a lithium-containing compound include, for example, a complex oxide containing lithium and a transition metal element, and a phosphate compound containing lithium and a transition metal element. In particular, a lithium-containing compound that contains at least one of cobalt (Co), nickel, and manganese (Mn) is preferable, since thereby a higher voltage can be obtained. The chemical formula thereof is expressed as, for example, $Li_xMIO_2$ or $Li_yMIIPO_4$. In the formula, MI and MII represent one or more transition metal elements. Values of x and y vary according to the charge and discharge state of the battery, and are generally in the range of $0.05 \leq x \leq 1.10$ and $0.05 \leq y \leq 1.10$.

Specific examples of the complex oxide containing lithium and a transition metal element include a lithium cobalt complex oxide ($Li_xCoO_2$), a lithium nickel complex oxide ($Li_xNiO_2$), a lithium nickel cobalt complex oxide ($Li_xNi_{1-z}Co_zO_2$ (Z<1)), a lithium manganese complex oxide having a spinel structure ($LiMn_2O_4$) and the like. Specific examples of the phosphate compound containing lithium and a transition metal element include, for example, lithium iron phosphate compound ($LiFePO_4$) and lithium iron manganese phosphate compound ($LiFe_{1-v}Mn_vPO_4$(v<1)).

Figure 7:
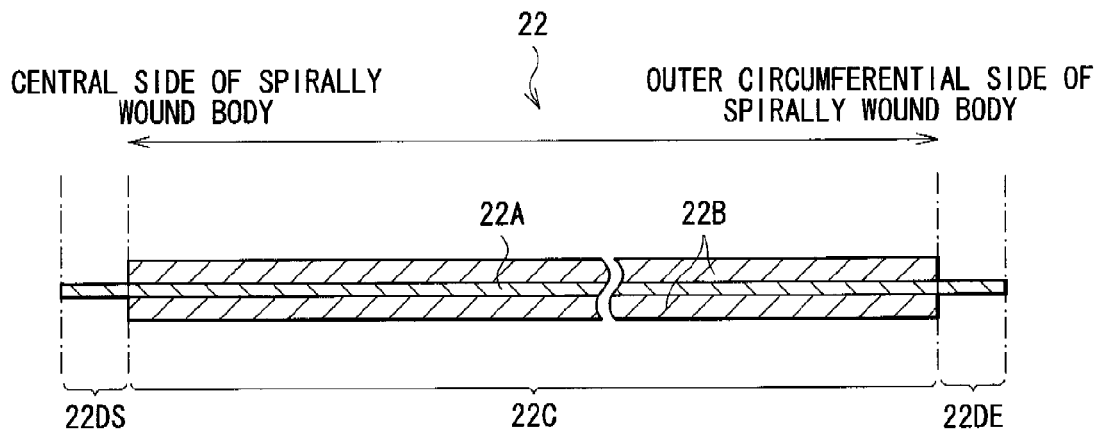
FIG. 7 is cross section showing a structure of an anode shown in FIG. 1 before being spirally wound.

FIG. 7 shows a structure of the anode 22. In the anode 22, an anode active material layer 22B is provided on the both faces of a strip-shaped anode current collector 22A. More specifically, the anode 22 has an anode coated region 22C in which the anode active material layer 22B exists on the both faces of the anode current collector 22A and anode exposed regions 22DS and 22DE which is located at the end on the central side and on the outer circumferential side of the spirally wound body so that the anode exposed regions 22DS and 22DE sandwich the anode coated region 22C, and in which the anode active material layer 22B does not exist on the both faces of the anode current collector 22A and thus the anode current collector 22A is exposed. The anode lead 25 is joined to the anode exposed region 22DE on the outer circumferential side of the spirally wound body.

The anode current collector 22A is, for example, made of a metal foil such as a copper foil, a nickel foil, and a stainless foil. The anode current collector 22A is, for example, about from 5 μm 50 μm thick.

The anode active material layer 22B contains, for example, an anode active material. If necessary, the anode active material layer 22B may contain an electrical conductor, a binder and the like. As the anode active material, for example, an anode material that can insert and extract lithium as an electrode reactant and contains at least one of metal elements and metalloid elements as an element can be cited. Such an anode material is preferably used, since a high energy density can be thereby obtained. Such an anode material may be a simple substance, an alloy, or a compound of a metal element or a metalloid element, or may be a material having one or more phases thereof at least in part. In the invention, alloys include an alloy containing one or more metal elements and one or more metalloid elements, in addition to an alloy including two or more metal elements. Further, an alloy in the invention may contain a nonmetallic element. The texture thereof includes a solid solution, a eutectic crystal (eutectic mixture), an intermetallic compound, and a texture in which two or more thereof coexist.

As such a metal element or such a metalloid element composing the anode material, for example, a metal element or a metalloid element capable of forming an alloy with lithium can be cited. Specifically, magnesium (Mg), boron (B), aluminum (Al), gallium (Ga), indium (In), silicon, germanium (Ge), tin, lead (Pb), bismuth (Bi), cadmium (Cd), silver (Ag), zinc (Zn), hafnium (Hf), zirconium (Zr), yttrium (Y), palladium (Pd), platinum (Pt) or the like can be cited.

Specially, as the anode material, a material containing a metal element or a metalloid element of Group 14 in the long period periodic table as an element is preferable, and a material containing at least one of silicon and tin as an element is particularly preferable. Silicon and tin have the high ability to insert and extract lithium, and can provide a high energy density. Specifically, for example, the simple substance, an alloy, or a compound of silicon; the simple substance, an alloy, or a compound of tin; or a material having one or more phases thereof at least in part can be cited.

As the alloy of tin, for example, an alloy containing at least one selected from the group consisting of silicon, nickel, copper, iron (Fe), cobalt (Co), manganese (Mn), zinc (Zn), indium (In), silver (Ag), titanium (Ti), germanium (Ge), bismuth (Bi), antimony (Sb), and chromium (Cr) as a second element other than tin can be cited. As the alloy of silicon, for example, an alloy containing at least one selected from the group consisting of tin, nickel, copper, iron, cobalt, manganese, zinc, indium, silver, titanium, germanium, bismuth, antimony, and chromium as a second element other than silicon can be cited.

As the compound of tin or the compound of silicon, for example, a compound containing oxygen (O) or carbon (C) can be cited. In addition to tin or silicon, the compound may contain the foregoing second element.

Specially, as the anode material, a CoSnC-containing material that contains tin, cobalt, and carbon as an element in which the carbon content is from 9.9 wt % to 29.7 wt %, and the cobalt ratio to the total of tin and cobalt is from 30 wt % to 70 wt % is preferable. In such a composition range, a high energy density can be obtained, and superior cycle characteristics can be obtained.

The CoSnC-containing material may further contain one or more other elements described below according to needs. Examples of other element include, for example, silicon, iron, nickel, chromium, indium, niobium (Nb), germanium, titanium, molybdenum (Mo), aluminum (Al), phosphorus (P), gallium (Ga), and bismuth. When such an element is contained, the capacity or the cycle characteristics are thereby further improved.

The CoSnC-containing material has a phase containing tin, cobalt, and carbon. Such a phase preferably has a low crystallinity structure or an amorphous structure. Further, in the CoSnC-containing material, at least part of carbon as an element is preferably bonded to a metal element or a metalloid element as other element. It is thought that lowering of cycle characteristics is caused by cohesion or crystallization of tin or the like. In this regard, when carbon is bonded to other element, such cohesion or crystallization can be prevented.

As a measurement method for examining bonding state of elements, for example, X-ray Photoelectron Spectroscopy (XPS) can be cited. In XPS, in the case of graphite, the peak of 1s orbit of carbon (C1s) is observed at 284.5 eV in the apparatus in which energy calibration is made so that the peak of 4 f orbit of gold atom (Au4f) is obtained in 84.0 eV. In the case of surface contamination carbon, the peak is observed at 284.8 eV. Meanwhile, in the case of higher electric charge density of carbon element, for example, when carbon is bonded to a metal element or a metalloid element, the peak of C1s is observed in the region lower than 284.5 eV. That is, when the peak of the composite wave of C1s obtained for the CoSnC-containing material is observed in the region lower than 284.5 eV, at least part of carbon contained in the CoSnC-containing material is bonded to the metal element or the metalloid element as other element.

In XPS measurement, for example, the peak of C1s is used for correcting the energy axis of spectrums. Since surface contamination carbon generally exists on the surface, the peak of C1s of the surface contamination carbon is set to in 284.8 eV, which is used as an energy reference. In XPS measurement, the waveform of the peak of C1s is obtained as a form including the peak of the surface contamination carbon and the peak of carbon in the CoSnC-containing material. Therefore, for example, the waveform is analyzed by using commercially available software to separate the peak of the surface contamination carbon and the peak of carbon in the CoSnC-containing material. In the analysis of the waveform, the position of the main peak existing on the lowest bound energy side is set to the energy reference (284.8 eV).

Further, as an anode active material, a carbon material such as natural carbon, artificial carbon, non-graphitizable carbon, and graphitizable carbon may be used. The carbon material is preferably used, since superior cycle characteristics can be obtained. Further, as an anode active material, lithium metal can be cited. One of the foregoing anode active materials may be used singly, or two or more thereof may be used by mixing.

The separator 23 is made of, for example, a porous film made of a polyolefin material such as polypropylene and polyethylene, or a porous film made of an inorganic material such as a ceramic nonwoven fabric. The separator 23 may have a structure in which two or more porous films as the foregoing porous films are layered.

An electrolytic solution as a liquid electrolyte is impregnated in the separator 23. The electrolytic solution contains a solvent and a lithium salt as an electrolyte salt. The solvent intends to dissolve and dissociate the lithium salt. Examples of the solvent include propylene carbonate, ethylene carbonate, diethyl carbonate, dimethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, ester acetate, ester butylate, and ester propionate. One thereof may be used singly, or two or more thereof may be used by mixing.

As the lithium salt, for example, $LiClO_4$, $LiAsF_6$, $LiPF_6$, $LiBF_4$, $LiB(C_6H_5)_4$, $CH_3SO_3Li$, $CF_3SO_3Li$, $LiCl$, or $LiBr$ is used. One thereof may be used singly, or two or more thereof may be used by mixing.

In the secondary battery, when charged, for example, lithium ions are extracted from the cathode 21, and are inserted in the anode 22 through the electrolytic solution impregnated in the separator 23. Meanwhile, when discharged, for example, lithium ions are extracted from the anode 22, and are inserted in the cathode 21 through the electrolytic solution impregnated in the separator 23.

The secondary battery can be manufactured, for example, as follows.

First, a cathode active material, an electrical conductor, and a binder are mixed to prepare a cathode mixture, which is dispersed in a solvent such as N-methyl-2-pyrrolidone to form paste cathode mixture slurry. Subsequently, the cathode current collector 21A is uniformly coated with the cathode mixture slurry by using a doctor blade, a bar coater or the like, and the solvent is dried. After that, the resultant is compression-molded by a rolling press machine or the like to form the cathode active material layer 21B and the cathode 21.

Next, an anode active material and a binder are mixed to prepare an anode mixture, which is dispersed in a solvent such as N-methyl-2-pyrrolidone to form paste anode mixture slurry. Subsequently, the anode current collector 22A is uniformly coated with the anode mixture slurry by using a doctor blade, a bar coater or the like, and the solvent is dried. After that, the resultant is compression-molded by a rolling press machine to form the anode mixture layer 22B and the anode 22. The rolling press machine may be used while being heated. Further, compression molding may be made a plurality of times until a target property can be obtained. Furthermore, a pressing machine other than the rolling press machine can be used.

Subsequently, the cathode lead 24 is attached to the cathode current collector 21A by welding or the like, and the anode lead 25 is attached to the anode current collector 22A by welding or the like. After that, the cathode 21 and the anode 22 are layered with the separator 23 in between, and spirally wound many times in spirally winding direction R shown in FIG. 6 and FIG. 7. After that, the resultant is formed and shaped, and thereby the flat battery element 20 is formed.

Next, the battery element 20 formed as above is contained in the package can 11. After that, the insulating plate 12 having the notches 12C and 12D is arranged on the battery element 20. The anode lead 25 is welded to the package can 11, and the cathode lead 24 is welded to the lower end of the cathode pin 15. The battery cover 13 is fixed on the open end of the package can 11 by laser welding. Finally, the electrolytic solution is injected into the package can 11 through the electrolytic solution injection hole 19, and is impregnated in the separator 23. After that, the electrolytic solution injection hole 19 is sealed by the sealing member 19A. The secondary battery shown in FIG. 1 and FIG. 2 is thereby completed.

In the secondary battery, when charged, for example, lithium ions are extracted from the cathode 21, and are inserted in the anode 22 through the electrolytic solution impregnated in the separator 23. Meanwhile, when discharged, for example, lithium ions are extracted from the anode 22, and are inserted in the cathode 21 through the electrolytic solution impregnated in the separator 23.

As above, in this embodiment, the cathode pin 15 connected to the cathode 21 is arranged so that the edge 151 T of the base 151 is spaced from the internal wall face of the cuboid package can 11 connected to the anode 22 with the distances C1 and C2 being 1.2 mm or less long. In addition, the insulating plate 12 having two notches 12C and 12D at the position where the base 151 of the cathode pin 15 is layered on the insulating plate 12 in the thickness direction (Y-axis direction) of the package can 11. Therefore, when the battery can is deformed due to excessive external force, short circuit between the edge 151T of the cathode pin 15 and the internal wall face of the package can 11 can be surely generated before internal short circuit is generated due to the damaged battery element 20. Therefore, heat generation of the battery element 20 can be prevented to improve the safety. Furthermore, in this embodiment, the foregoing short circuit mechanism is structured without adding a new member. Thus, the battery according to this embodiment is advantageous with regard to simplifying the structure and the manufacturing steps. Consequently, this embodiment is suitable for attaining a small sized battery and mass production thereof.

Modification

In the foregoing embodiment, the insulating plate 12 has two notches 12C and 12D. However, when the distances C1 and C2 between the edge 151T of the base 151 and the internal wall face of the package can 11 are 1.0 mm or less, effects similar to those of the foregoing embodiment can be obtained without providing such a notch.

EXAMPLES

Specific examples of the invention will be described in detail.

Examples 1-1 and 1-2

The secondary batteries described in the foregoing embodiment were fabricated. However, as the insulating plate 12, an insulating plate without the notch was used. First, lithium carbonate ($Li_2CO_3$) and cobalt carbonate ($CoCO_3$) were mixed at a molar ratio of $Li_2CO_3$: $CoCO_3$=0.5:1. After that, the mixture was fired in the air at 900 deg C. for 5 hours. Thereby, lithium cobalt complex oxide ($LiCoO_2$) as a cathode active material was obtained. Next, 91 parts by weight of the lithium cobalt complex oxide, 6 parts by weight of graphite as an electrical conductor, and 3 parts by weight of polyvinylidene fluoride as a binder were mixed to obtain a cathode mixture. Subsequently, the cathode mixture was dispersed in N-methyl-2-pyrrolidone as a solvent to obtain cathode mixture slurry. Finally, the both faces of the cathode current collector 21A made of an aluminum foil being 20 μm thick were uniformly coated with the cathode mixture slurry, which was dried. After that, the resultant was compression-molded by a roll pressing machine to form the cathode active material layer 21B and the cathode 21. Subsequently, the cathode lead 24 made of aluminum was attached to one end of the cathode current collector 21A.

Then, a CoSnC-containing material was formed as an anode active material. First, as raw materials, cobalt powder, tin powder, carbon powder were prepared. Cobalt powder and tin powder were alloyed to form cobalt-tin alloy powder, to which carbon powder was added and dry-blended. Subsequently, the mixture was synthesized with the use of a planetary ball mill by using mechanochemical reaction to obtain the CoSnC-containing material.

For the obtained CoSnC-containing material, the composition was analyzed. In the result, the cobalt content was 29.3 wt %, the tin content was 49.9 wt %, and the carbon content was 19.8 wt %. The carbon content was measured by a carbon sulfur analyzer. The cobalt content and the tin content were measured by ICP (Inductively Coupled Plasma) optical emission spectroscopy. Further, for the obtained CoSnC-containing material, X-ray diffraction was performed. In the result, the diffraction peak having a wide half value width with the diffraction angle $2\theta$ of 1.0 degree or more was observed in the range of diffraction angle $2\theta$=from 20 to 50 degrees. Further, when XPS was performed for the CoSnC-containing material, the peak of C1s in the CoSnC-containing material was obtained in the region lower than 284.5 eV. That is, it was confirmed that carbon in the CoSnC-containing material was bonded to other element.

Next, 60 parts by weight of the CoSnC-containing material, 28 parts by weight of artificial graphite and 2 parts by weight of carbon black as an electrical conductor and an anode active material, and 10 parts by weight of polyvinylidene fluoride as a binder were mixed to obtain an anode mixture. Subsequently, the anode mixture was dispersed in N-methyl-2-pyrrolidone as a solvent to obtain anode mixture slurry. The both faces of the anode current collector 22A made of a copper foil being 15 μm thick were uniformly coated with the anode mixture slurry, which was dried. After that, the resultant was compression-molded by a roll pressing machine to form the anode active material layer 22B. After that, the anode lead 25 made of nickel was attached to one end of the anode current collector 22A.

Subsequently, the separator 23 made of a micro porous polypropylene film being 16 μm thick was prepared. The cathode 21, the separator 23, the anode 22, and the separator 23 were layered in this order to form a lamination. After that, the resultant lamination was spirally wound many times, and thereby the battery element 20 was formed. The obtained battery element 20 was formed into a flat shape.

Next, the battery element 20 formed in the flat shape was contained in the package can 11. After that, the insulating plate 12 was arranged on the battery element 20. The anode lead 25 was welded to the package can 11, and the cathode lead 24 was welded to the lower end of the cathode pin 15. The battery cover 13 was fixed on the open end of the package can 11 by laser welding. After that, the electrolytic solution was injected into the package can 11 through the electrolytic solution injection hole 19. As the electrolytic solution, $LiPF_6$ as an electrolyte salt with the content of 1 mol/dm$^3$ was dissolved in a mixed solvent of 30 volume % of ethylene carbonate and 70 volume % of diethyl carbonate, and then the resultant solution was used. Finally, the electrolytic solution injection hole 19 was sealed by the sealing member 19A, and thereby a square secondary battery was obtained.

For example, the package can 11 used in these examples was made of an iron alloy containing carbon (C) and manganese (Mn), has a wall being 0.29 mm thick, and in the shape of a cuboid having the internal face being 34 mm wide (dimension in the X-axis direction), 6.0 mm thick (dimension in the Y-axis direction), and 42 mm high (dimension in the Z-axis direction). In these examples, further, the cathode pin 15 made of aluminum in which the width dimension t15 of the base 151 was from 4.00 to 4.50 mm, and the dimension in the Z-axis direction of the base 151 was 0.05 mm was used.

As Comparative examples 1-1 to 1-5 relative to Examples 1-1 and 1-2, secondary batteries were fabricated in the manner similar to that of Examples 1-1 and 1-2, except that the width dimension t15 of the base 151 was from 3.50 to 3.90 mm.

5 pieces of secondary batteries (battery 1 to battery 5) obtained as above were respectively formed for Examples 1-1 to 1-2 and Comparative examples 1-1 to 1-5. Then, cruch test was performed for those batteries to examine presence of firing or bursting. Obtaining results are shown Table 1.

Examples 1-1 and 1-2 in which the distances c1 and c2 were 1.00 mm or less, all 5 batteries thereof were prevented from being burst. Therefore, it was found that when the distances c1 and c2 between the end 151T of the base 151 and the internal face of the package can 11 were 1 mm or less, in the case that the package can 11 was crushed, the battery reaction could be stopped to safely lose the power generation function by contacting the cathode pin 15 with the package can 11 before short circuit was generated inside the battery element 20.

Examples 2-1 to 2-4

Next, 5 pieces of secondary batteries (battery 1 to battery 5) were respectively formed for Examples 2-1 to 2-4 and Comparative example 2-1 that respectively have the structure similar to that of Comparative examples 1-1 to 1-5, except that the notches 12C and 12D were provided for the insulating plate 12.

For Examples 2-1 to 2-4 and Comparative example 2-1, crush test was performed in the manner similar to that of

TABLE 1

Distance between the internal wall faces of the package can, t11; 6.00 mm

| | Width dimension t15 | Distances c1 and c2 | Evaluation | | | | |
|---|---|---|---|---|---|---|---|
| | | | Battery 1 | Battery 2 | Battery 3 | Battery 4 | Battery 5 |
| Example 1-1 | 4.50 | 0.75 | No bursting | No bursting | No bursting | No bursting | No bursting |
| Example 1-2 | 4.00 | 1.00 | No bursting | No bursting | No bursting | No bursting | No bursting |
| Comparative example 1-1 | 3.90 | 1.05 | No bursting | No bursting | No bursting | No bursting | Bursting |
| Comparative example 1-2 | 3.80 | 1.10 | No bursting | No bursting | No bursting | Bursting | Bursting |
| Comparative example 1-3 | 3.70 | 1.15 | No bursting | No bursting | Bursting | Bursting | Bursting |
| Comparative example 1-4 | 3.60 | 1.20 | No bursting | Bursting | Bursting | Bursting | Bursting |
| Comparative example 1-5 | 3.50 | 1.25 | Bursting | Bursting | Bursting | Bursting | Bursting | which the distances c1 and c2 were larger than 1.00 mm, at least one of 5 secondary batteries was burst. Meanwhile, in Examples 1-1 and 1-2 to examine presence of firing or bursting. Obtained results are shown in Table 2.

TABLE 2

Distance between the internal wall faces of the package can, t11; 6.00 mm

| | Width dimension t15 | Distances c1 and c2 | Notch | Evaluation | | | | |
|---|---|---|---|---|---|---|---|---|
| | | | | Battery 1 | Battery 2 | Battery 3 | Battery 4 | Battery 5 |
| Example 2-1 | 3.90 | 1.05 | Present | No bursting | No bursting | No bursting | No bursting | No bursting |
| Example 2-2 | 3.80 | 1.10 | Present | No bursting | No bursting | No bursting | No bursting | No bursting |
| Example 2-3 | 3.70 | 1.15 | Present | No bursting | No bursting | No bursting | No bursting | No bursting |
| Example 2-4 | 3.60 | 1.20 | Present | No bursting | No bursting | No bursting | No bursting | No bursting |
| Comparative example 2-1 | 3.50 | 1.25 | Present | No bursting | No bursting | No bursting | No bursting | Bursting |
| Comparative example 1-1 | 3.90 | 1.05 | Not present | No bursting | No bursting | No bursting | No bursting | Bursting |
| Comparative example 1-2 | 3.80 | 1.10 | Not present | No bursting | No bursting | No bursting | Bursting | Bursting |

TABLE 2-continued

Distance between the internal wall faces of the package can, t11: 6.00 mm

| | Width dimension t15 | Distances c1 and c2 | Notch | Evaluation |  |  |  |  |
|---|---|---|---|---|---|---|---|---|
| | | | | Battery 1 | Battery 2 | Battery 3 | Battery 4 | Battery 5 |
| Comparative example 1-3 | 3.70 | 1.15 | Not present | No bursting | No bursting | Bursting | Bursting | Bursting |
| Comparative example 1-4 | 3.60 | 1.20 | Not present | No bursting | Bursting | Bursting | Bursting | Bursting |
| Comparative example 1-5 | 3.50 | 1.25 | Not present | Bursting | Bursting | Bursting | Bursting | Bursting |

As evidenced by Table 2, when the distance c1 and c2 were 1.20 mm or less in the case that the insulating plate 12 having the notches 12C and 12D was used, the all 5 pieces of batteries (battery 1 to battery 5) could be prevented from being burst (Examples 2-1 to 2-4). That is, it was found that even when the distance c1 and c2 between the cathode pin 15 and the internal wall face of the package can 11 were somewhat increased, by providing the insulating plate 12 with the notched 12C and 12D, the battery reaction could be stopped to safely lose the power generation function by surely contacting the cathode pin 15 with the package can 11 before short circuit was generated inside the battery element 20.

The invention has been described with reference to the embodiment and the examples. However, the invention is not limited to the foregoing embodiment and the foregoing examples, and various modifications may be made. For example, in the foregoing embodiment and the foregoing examples, the descriptions have been given of the case that the package can is connected to the anode and the external connection terminal is connected to the cathode. However, the connection relationship may be opposite to the foregoing.

Further, in the foregoing embodiment and the foregoing examples, the descriptions have been given of the square secondary battery having the spirally winding structure. However, the invention can be applied to a secondary battery that has a battery element including a cathode and an anode and has a package can (for example, cylindrical secondary battery).

Further, in the foregoing embodiment and the foregoing examples, the descriptions have been given of the case using the electrolytic solution that is a liquid electrolyte as a solvent. However, instead of the electrolytic solution, other electrolyte may be used. As other electrolyte, for example, a gel electrolyte in which an electrolytic solution is held by a high polymer compound, a solid electrolyte having ion conductivity, a mixture of a solid electrolyte and an electrolytic solution, or a mixture of a solid electrolyte and a gel electrolyte can be cited.

The gel electrolyte may be used for various polymer compounds as long as the polymer compound can absorb and gelate an electrolytic solution. As such a polymer compound, for example, a fluorinated polymer compound such as polyvinylidene fluoride and a copolymer of vinylidene fluoride and hexafluoropropylene; an ether polymer compound such as polyethylene oxide and a cross-linked compound containing polyethylene oxide; polyacrylonitrile or the like can be cited. In particular, in terms of redox stability, the fluorinated polymer compound is desirable.

As the solid electrolyte, for example, an organic solid electrolyte in which an electrolyte salt is dispersed in a polymer compound having ion conductivity, or an inorganic solid electrolyte made of ion conductive glass, ionic crystal or the like can be used. As the polymer compound, for example, an ether polymer compound such as polyethylene oxide and a cross-linked compound containing polyethylene oxide; an ester polymer compound such as polymethacrylate; or an acrylate polymer compound can be used singly, by mixing, or by being copolymerized in a molecule. Further, as the inorganic solid electrolyte, lithium nitride, lithium iodide or the like can be used.

Further, in the foregoing embodiment and the foregoing examples, the descriptions have been given of the case using lithium as an electrode reactant. However, the invention can be applied to a case using other Group 1 element in the long period periodic table such as sodium (Na) and potassium (K); a Group 2A element in the long period periodic table such as magnesium and calcium (Ca); other light metal such as aluminum; or an alloy of lithium or the foregoing elements. In this case, similar effects can be obtained. An anode active material capable of inserting and extracting an electrode reactant, a cathode active material, a solvent and the like can be selected according to the electrode reactant.

It should be understood by those skilled in the art that various modifications, combinations, sub-combinations and alternations may occur depending in design requirements and other factors insofar as they are within the scope of the appended claims or the equivalents thereof.

What is claimed is:
1. A battery comprising:
   a battery element having a cathode and an anode wound about an axis extending in a first direction;
   a package containing the battery element and having an internal surface of a wall thereof electrically connected to one of the cathode and the anode;
   an external connection terminal being connected to the other one of the cathode and the anode, and having a plate-shaped base contained in the package and a leading portion extending to outside of the package;
   a cover member that closes an opening of the package and through which the leading portion of the external connection terminal extends;
   a lead extending from the other one of the cathode and anode to the plate-shaped base of the external connection terminal; and
   a single insulating member separating the external connection terminal from the battery element, wherein the single insulating member is the only insulating component that separates the external connection terminal from the battery element,
   wherein,
   the base of the external connection terminal is spaced from an internal wall face of the package,
   the insulating member extends in a second and third direction, both directions being orthogonal to the first direction, the second direction being a thickness direction of the package, and the third direction corresponding to a long axis direction of the package, wherein the insulating member has a first notch and a second notch positioned at opposite sides of the insulating member in the thickness direction, wherein the base of the external connection terminal is positioned substantially between the first notch and second notch in the thickness direction, the notches exposing the base of the external connection terminal to the internal wall face of the package, the leading portion of the external connection terminal extends from a center of the base of the external connection terminal, a distance between the base of the external connection terminal and the internal wall face of the package in the thickness direction is 1.20 mm or less, the notches are aligned with the external connection terminal in the thickness direction such that the notches are structured to receive an edge of the plate-shaped base of the external connection terminal in the thickness direction to enable the edge of the plate-shaped base to contact the internal wall face of the package, and the notches and the external connection terminal are substantially centered along the third direction of the package, wherein the plate-shaped base and the leading portion are a single piece.

2. The battery according to claim 1, wherein the battery element has a structure in which the cathode having a cathode active material layer on a strip-shaped cathode current collector and the anode having an anode active material layer on a strip-shaped anode current collector are layered with a separator in between and spirally wound.

3. The battery according to claim 1, wherein the anode contains an anode active material to insert and extract an electrode reactant, and contains at least one of a metal element and a metalloid element as an element.

4. The battery according to claim 3, wherein the anode contains, as the anode active material, a material containing at least one of tin (Sn) and silicon (Si) as an element.

5. The battery according to claim 3, wherein the anode contains, as the anode active material, a CoSnC-containing material that contains tin, cobalt (Co), and carbon (C) as an element in which a carbon content is from 9.9 wt % to 29.7 wt %, and a cobalt ratio to the total of tin and cobalt is from 30 wt % to 70 wt %.

6. The battery of claim 1, wherein the cover member includes a cleavage valve.

7. The battery of claim 1, wherein the one of the cathode and the anode is welded and electrically connected to the internal surface of the wall of the package by means of a lead that extends toward and along the internal surface of the wall and a lead, connecting the other of the cathode and the anode to the plate-shaped base of the external connection terminal, that is beneath the plate-shaped base member and the insulating member.

8. The battery of claim 1, wherein the plate-shaped base is larger than the leading portion of the external connection terminal in the thickness direction.

9. The battery of claim 1, wherein the base of the external connection terminal comprises a first width in the thickness direction and the package comprises a second width in the thickness direction, wherein the ratio of the second width to the first width is less than or equal to about 1.71.

10. The battery of claim 1, wherein the lead is layered between the plate-shaped base and the single insulating member in the first direction.

11. A method for protecting a battery from overheating when exposed to an excessive external force comprising:
providing a battery as described in claim 1;
inserting the at least one edge through at least one of the notches;
contacting the at least one edge with the internal wall face; and
creating a short circuit such that the battery is prevented from overheating.

12. A battery comprising:
a battery element having a cathode and an anode;
a package containing the battery element and having an internal surface of a wall thereof electrically connected to one of the cathode and the anode;
an external connection terminal being connected to the other one of the cathode and the anode, and having a plate-shaped base contained in the package and a leading portion extending to outside of the package;
a cover member that closes an opening of the package and through which the leading portion of the external connection terminal extends;
a lead extending from the other one of the cathode and anode to the plate-shaped base of the external connection terminal; and
a single insulating member separating the external connection terminal from the battery element, wherein the single insulating member is the only insulating component that separates the external connection terminal from the battery element,
wherein,
the leading portion of the external connection terminal extends from a center of the base of the external connection terminal,
the base of the external connection terminal is spaced in the thickness direction substantially between a first internal wall face of the package without an insulating member and a second internal wall face of the package without an insulating member, with a space provided in the thickness direction between a surface of the base of the external connection terminal and at least one of the internal wall faces, and the distance therebetween is 1 mm or less,
the first and second internal wall faces without an insulating member are both aligned with the external connection terminal in the thickness direction such that the the first and second internal wall faces without an insulating member are both structured to receive an edge of the plate-shaped base of the external connection terminal in the thickness direction and enable the edge of the plate-shaped base to contact the internal wall face of the package, and
the first and second internal wall faces without an insulating member and the external connection terminal are substantially centered along a third direction correspond to a long axis of the package,
wherein the plate-shaped base and the leading portion are a single piece.

13. The battery of claim 12, wherein the first internal wall face without an insulating member and the second internal wall face without an insulating member comprise a first notch and a second notch, respectively, in the single insulating member.

14. The battery of claim 12, wherein the base of the external connection terminal comprises a first width in the thickness direction and the package comprises a second width in the thickness direction, wherein the ratio of the second width to the first width is less than or equal to about 1.71.

15. A battery comprising:
a battery element having a cathode and an anode wound about an axis extending in a first direction;
a package containing the battery element and having an internal surface of a wall thereof electrically connected to one of the cathode and the anode;
an external connection terminal being connected to the other one of the cathode and the anode, and having a plate-shaped base contained in the package and a leading portion extending to outside of the package, wherein the plate-shaped base and the leading portion are a single piece;
a cover member that closes an opening of the package and through which the leading portion of the external connection terminal extends;
a lead extending from the other one of the cathode and anode to the plate-shaped base of the external connection terminal; and
a single insulating member separating the external connection terminal from the battery element, wherein the single insulating member is the only insulating component that separates the external connection terminal from the battery element,
wherein,
the base of the external connection terminal is spaced from an internal wall face of the package,
the insulating member extends in a second and third direction, both directions being orthogonal to the first direction, the second direction being a thickness direction of the package,
the insulating member has notches at opposite sides of the insulating member in the thickness direction and at a position where the base of the external connection terminal is positioned substantially between the notches in the thickness direction of the package,
the notches exposing the base of the external connection terminal to the internal wall face of the package,
the leading portion of the external connection terminal extends from a center of the base of the external connection terminal,
a distance between the base of the external connection terminal and the internal wall face of the package in the thickness direction is 1.20 mm or less, and
the notches are aligned with the external connection terminal in the thickness direction such that the notches are structured to receive an edge of the plate-shaped base of the external connection terminal in the thickness direction and enable the edge of the plate-shaped base to contact the internal wall face of the package.

16. The battery of claim 15, wherein the single piece external connection terminal is formed from a monolithic piece of material.

* * * * *